US006618273B2

(12) United States Patent
Zayatz et al.

(10) Patent No.: US 6,618,273 B2
(45) Date of Patent: Sep. 9, 2003

(54) TRACE FUSE

(75) Inventors: Robert Zayatz, North Tonawanda, NY (US); Timothy R. Ronald, Clarence, NY (US); Douglas L. Bronnenberg, Richmond, VA (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 10/107,769

(22) Filed: Mar. 27, 2002

(65) Prior Publication Data

US 2002/0159209 A1 Oct. 31, 2002

Related U.S. Application Data

(60) Provisional application No. 60/279,167, filed on Mar. 27, 2001.

(51) Int. Cl.[7] .......................... H01R 9/00; H01H 35/02; H05K 7/02
(52) U.S. Cl. ...................... 361/824; 361/823; 361/837; 361/833; 361/752; 361/736
(58) Field of Search ................................. 361/104, 760, 361/761, 752, 736, 728, 824, 833, 834, 837

(56) References Cited

U.S. PATENT DOCUMENTS

| 2,934,627 A | 4/1960 | Bristol et al. |
| 2,941,059 A | 6/1960 | Sims et al. |
| 3,358,363 A | 12/1967 | Jacks et al. |
| 3,361,884 A | 1/1968 | Parkes |
| 3,858,142 A | 12/1974 | Deelman et al. |
| 3,898,603 A | 8/1975 | Cricchi et al. |
| 4,032,949 A | 6/1977 | Bierig |
| 4,140,988 A | 2/1979 | Oakes |
| 4,198,744 A | 4/1980 | Nicolay |
| 4,261,804 A | 4/1981 | McGivern, Jr. |
| 4,272,753 A | 6/1981 | Nicolay |
| 4,296,398 A | 10/1981 | McGalliard |
| 4,376,927 A | 3/1983 | McGalliard |
| 4,379,318 A | 4/1983 | Ootsuka |
| 4,394,639 A | 7/1983 | McGalliard |
| 4,477,857 A | 10/1984 | Crocker |
| 4,652,848 A | 3/1987 | Hundrieser |
| 4,742,425 A | 5/1988 | Conzelmann et al. |
| 4,862,134 A | 8/1989 | Poerschke et al. |
| 5,185,291 A | 2/1993 | Fischer et al. |
| 5,196,819 A | 3/1993 | Roberts |
| 5,644,282 A | * 7/1997 | Mehta et al. ................ 337/295 |
| 5,699,032 A | * 12/1997 | Ulm, Jr. et al. ............. 337/297 |
| 5,786,240 A | 7/1998 | Look et al. |
| 5,815,790 A | 9/1998 | Billgren et al. |
| 5,977,860 A | * 11/1999 | Ulm, Jr. et al. ............. 337/297 |
| 5,994,993 A | * 11/1999 | Castonguay, Jr. et al. .. 337/206 |
| 6,205,034 B1 | * 3/2001 | Zayatz ........................ 361/824 |
| 6,317,335 B1 | * 11/2001 | Zayatz ........................ 361/824 |
| 6,414,847 B1 | * 7/2002 | Hutchison et al. .......... 361/704 |
| 6,426,867 B1 | * 7/2002 | Zayatz ........................ 361/626 |
| 6,436,577 B1 | * 8/2002 | Kida et al. ............. 429/231.95 |
| 6,437,239 B1 | * 8/2002 | Zayatz ........................ 174/52.1 |
| 6,447,946 B1 | * 9/2002 | Nakai et al. ................... 429/53 |
| 6,447,952 B1 | * 9/2002 | Spiegel et al. ........... 429/218.1 |
| 6,455,199 B1 | * 9/2002 | Kitagawa et al. ......... 429/231.8 |
| 6,456,186 B1 | * 9/2002 | Oglesbee .................... 337/161 |

OTHER PUBLICATIONS

Bogaard, R. H. et al., Thermophysical Properties Of Stainless Steels, Themochimica Acta, 218 (1993), 373–393, Elsevier Science Publishers B. V., Amsterdam.

* cited by examiner

*Primary Examiner*—David Martin
*Assistant Examiner*—Dameon E. Levi
(74) *Attorney, Agent, or Firm*—Michael F. Scalise

(57) ABSTRACT

A power providing device that has a battery, a protective housing a terminal cap, and a fuse on a substrate.

20 Claims, 5 Drawing Sheets

TRACE FUSE

CLAIM OF PRIORITY

This application claims the benefit of U.S. patent application Ser. No. 60/279,167 filed on Mar. 27, 2001.

BACKGROUND INFORMATION

The invention relates generally to fuses.

BRIEF DESCRIPTION OF THE DRAWINGS

For a fuller understanding of the nature and objects of the invention, reference should be made to the following detailed description taken in conjunction with the accompanying drawings, in which.

DETAILED DESCRIPTION

Figure 1:
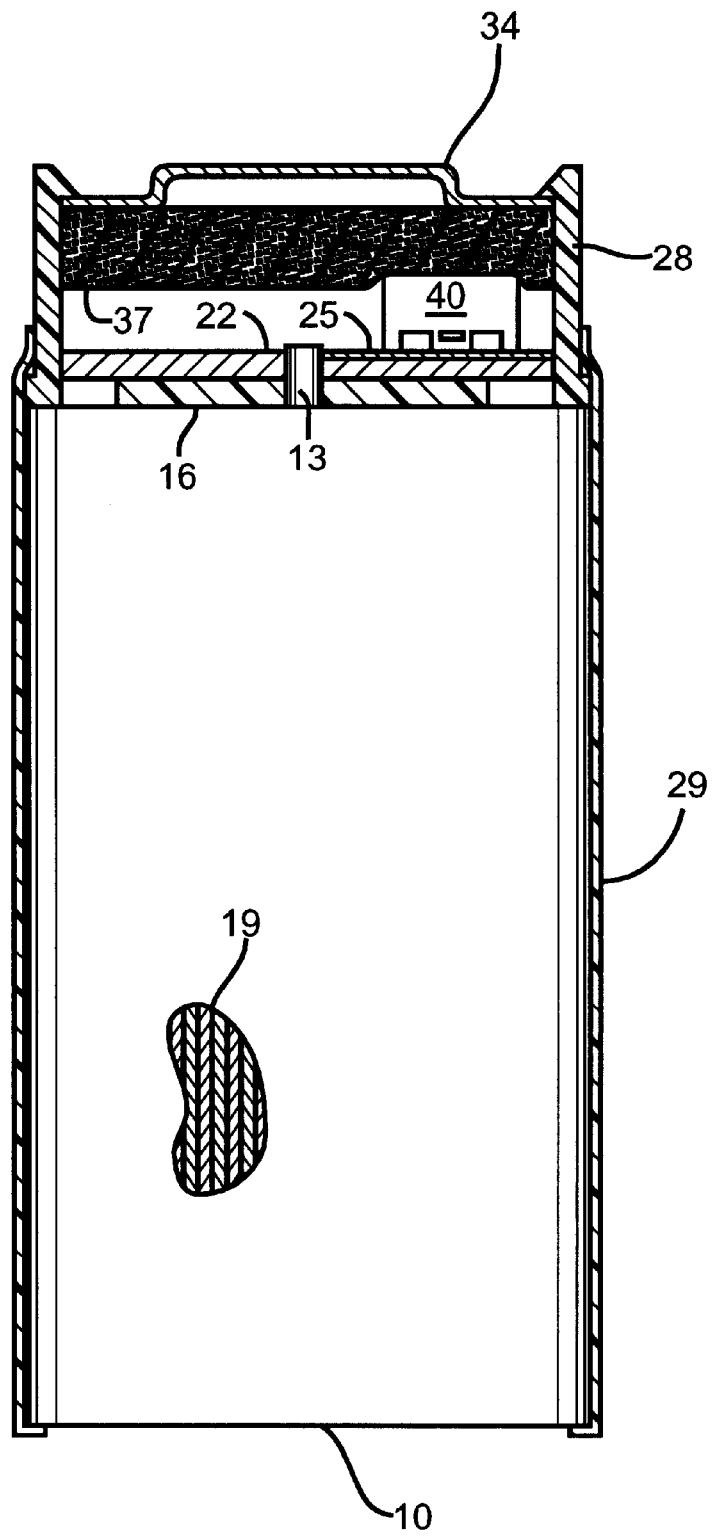
FIG. 1 is a partially cross sectioned side view of a device in accordance with one embodiment of the invention.
Figure 2:
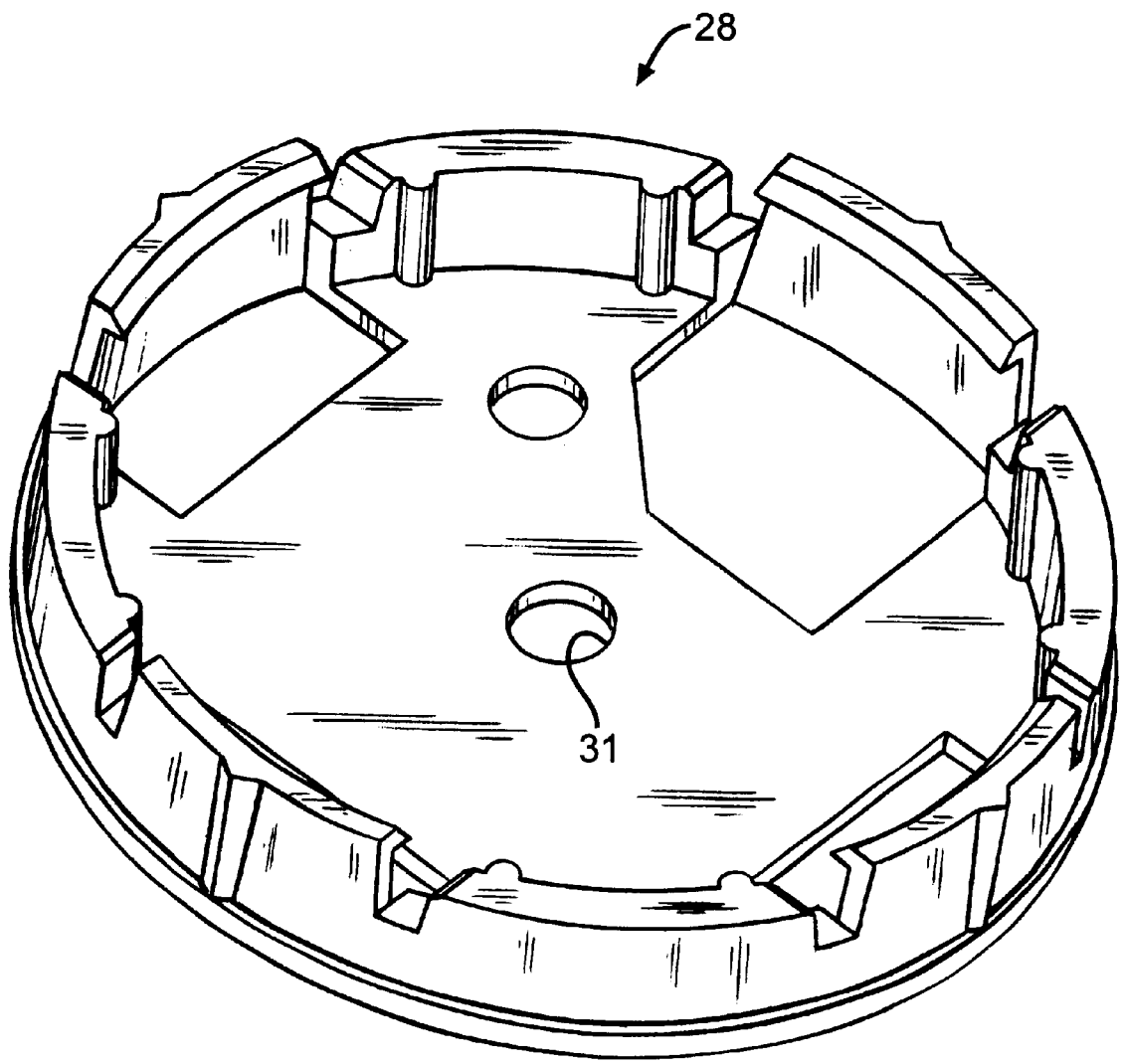
FIG. 2 is a perspective view of a housing in accordance with one embodiment of the invention.
Figure 3:
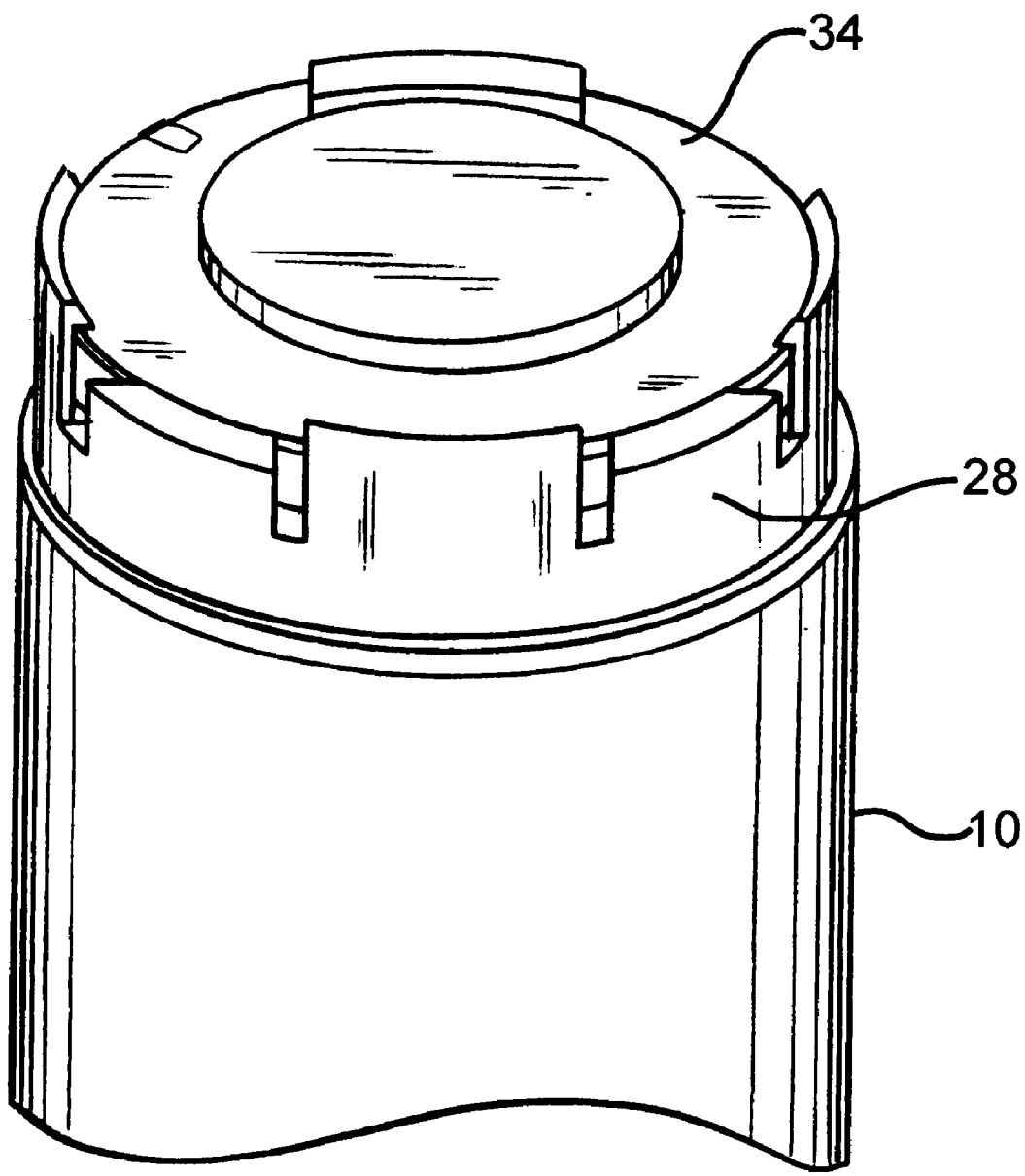
FIG. 3 is a perspective view of a device in accordance with one embodiment of the invention.

The present invention is a power providing device. FIGS. 1, 2 and 3 show an embodiment of the invention that includes a battery 10 having a terminal pin 13 extending from a header 16. The battery 10 may include an electrode 19 having lithium. The battery 10 may be a primary (non-rechargeable) battery, or may be a secondary battery (rechargeable).

Figures 4A, 4B:
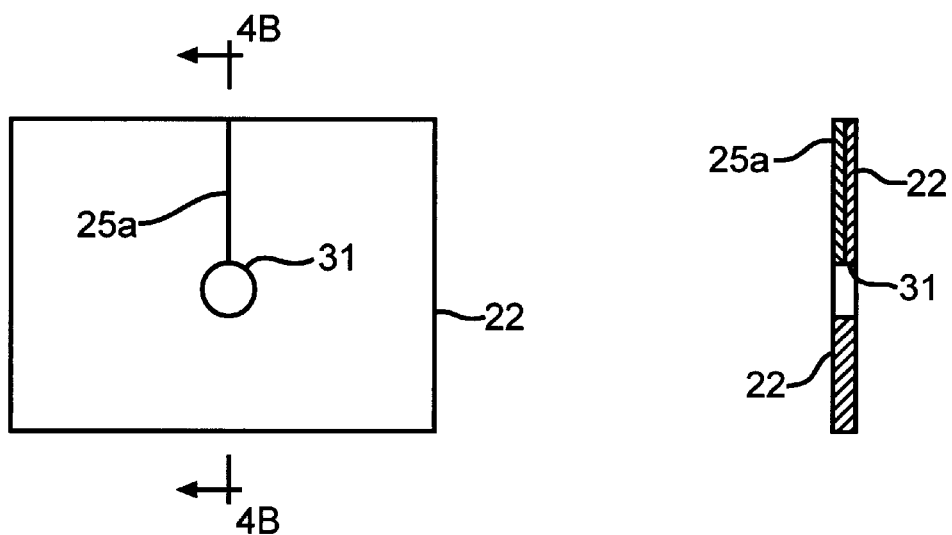
FIG. 4A shows a substrate with a fuse in accordance with one embodiment of the invention.
FIG. 4B is a cross sectional side view of the substrate and fuse shown in FIG. 4A taken along the line 4B—4B.

A substrate 22 may be attached to the battery 10, and a fuse 25 may be attached to the substrate 22 and electrically connected to the terminal pin 13. FIGS. 4A and 4B show a substrate and a fuse. The fuse 25 may include copper or tin, or both. The fuse 25 may be designed to separate at less than about 20 amps of electric current.

The protective housing 28 may be attached to the battery 10, for example with shrink wrap 29. The substrate 22 may contact the housing 28. The protective housing 28 may have an orifice 31 within which the terminal pin 13 may reside. A conductive terminal cap 34 may be attached to the housing 28. The substrate 22 may reside between the terminal cap 34 and the battery 10. The substrate 22 may reside between the terminal cap 34 and the housing 28.

Figure 5A:
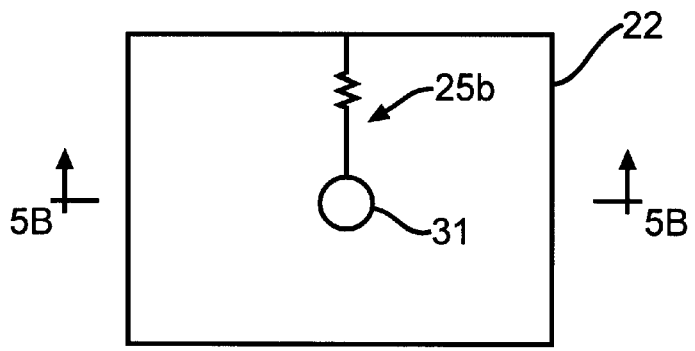
FIG. 5A shows a substrate with a fuse in accordance with one embodiment of the invention.
Figure 5B:
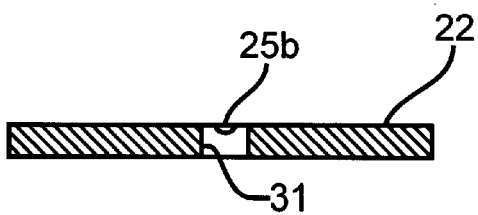
FIG. 5B is a cross sectional side view of the substrate and fuse shown in FIG. 5B taken along the line 5B—5B.

FIGS. 4A and 4B show a fuse 25a having a substantially straight conductive path. FIG. 5A shows a fuse 25b that provides a zig-zag conductive path. In this manner, the size of the substrate 22 need not change to accommodate fuses 25, 25a, 25b of differing lengths.

FIGS. 4A and 4B show an embodiment of the invention in which the fuse 25a is embedded in the substrate 22. In this fashion, the fuse 25a may be protected from damage that might otherwise be caused, for example, during assembly of the substrate 22 with the battery 10. The customary glass enclosure found in many fuses may not be present.

Figure 6:
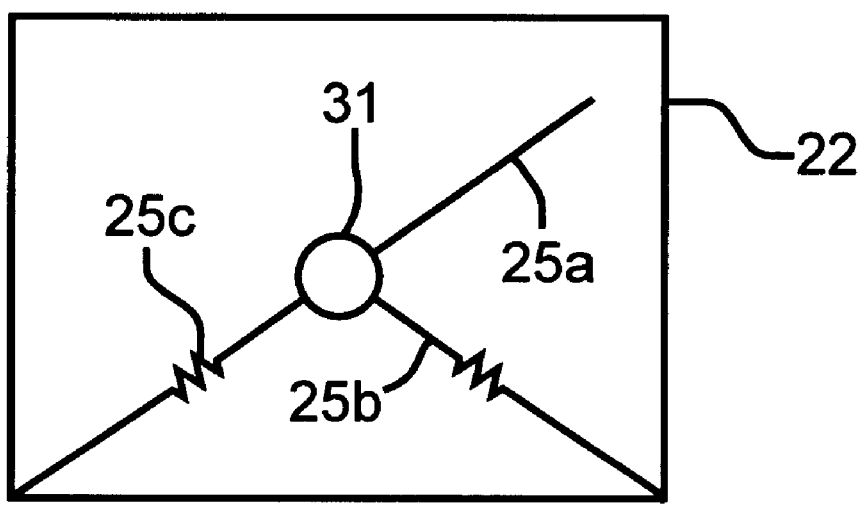
FIG. 6 shows a substrate with several fuses in accordance with one embodiment of the invention.

FIG. 6 shows an embodiment of the invention in which several fuses 25a, 25b, 25c each having a different current limit, may be placed on a single substrate 22. For example, a single substrate 22 may have fuses 25a, 25b, 25c of differing cross sectional area, length or material so as to provide fuses 25a, 25b, 25c each having a different current limit. In assembling such a substrate 22 with the battery 10, the fuse (25a, 25b, or 25c) having the desired current limit may be electrically connected to the battery 10 and, for example, an electrical device 40. The other fuses may not be electrically connected to provide a conductive path from the battery 10, although they may be connected to the terminal pin 13 of the battery 10. In this fashion, a single type of substrate 22 may be stocked for use with many different types of batteries 10 or electrical devices 40, or both.

The substrate 22 may include a ceramic material, a polyamide material, polytetraflouroethylene, glass reinforced hydrocarbon/ceramic laminate, or some combination of the foregoing materials. Examples of glass reinforced hydrocarbon/ceramic laminates include those made by Rogers Corporation of Chandler, Arizona and marketed under the trademark RO4000® Series.

A compressible pad 37 may be included to firmly hold the substrate 22 within the housing 28. As shown in FIG. 1, the compressible pad 37 may contact an electrical device 40 in order to hold the substrate 22. However, it should be noted that the compressible pad 37 may also contact the substrate 22.

Although the invention has been described with respect to one or more particular embodiments, it will be understood that other embodiments of the invention may be made without departing from the spirit and scope of the invention.

What is claimed is:

1. An electrical power providing device, comprising:
   a) a battery having a terminal pin extending from a header;
   b) a substrate attached to the battery; and
   c) a trace fuse supported by the substrate, the fuse having a fusible portion intermediate first and second ends, wherein the first end is directly electrically connected to the terminal pin and the second end is directly electrically connected to an electrical device powered by the battery.

2. The power providing device of claim 1, wherein the fusible portion of the fuse provides a zig-zag conductive path.

3. The power providing device of claim 1, wherein the fusible portion of the fuse provides a substantially straight conductive path.

4. The power providing device of claim 1, wherein the fuse is embedded in the substrate.

5. The power providing device of claim 1, wherein the fuse includes at least one of copper or tin.

6. The power providing device of claim 1, wherein the battery includes an electrode having lithium.

7. The power providing device of claim 1, wherein the fusible portion of the fuse separates at less than about 20 amps of electric current.

8. The power providing device of claim 1, wherein the substrate resides between the battery and a terminal cap for the battery.

9. The power providing device of claim 1, further comprising a housing attached to the battery, and the substrate contacts the housing.

10. The power providing device of claim 9, further comprising a terminal cap attached to the housing, wherein the substrate resides between the terminal cap and the housing.

11. The power providing device of claim 9, wherein the housing has an orifice, and the terminal pin resides in the orifice.

12. The power providing device of claim 1, wherein the substrate includes a material selected from the group consisting of a ceramic material, a polyamide material, and polytetrafluoroethylene.

13. The power providing device of claim 1, wherein the substrate includes glass reinforced hydrocarbon/ceramic laminate.

14. The power providing device of claim 1, wherein the substrate includes at least two fuses of different current limits, wherein one of the fuses is electrically connected to the terminal pin and the electrical device while the other fuse is not.

15. The power providing device of claim 1, wherein the substrate has an orifice therethrough for receiving the terminal pin, and the trace fuse extends generally radially away from the terminal pin.

16. The power providing device of claim 15, further comprising a second trace fuse extending generally radially away from the terminal pin.

17. A substrate having first and second major sides with a surrounding outer edge between the major sides providing the substrate with a thickness and with an aperture extending through the substrate thickness to the first and second major sides, wherein the substrate supports at least one trace fuse having a fusible portion intermediate first and second fuse ends, the first fuse end residing at a side wall of the aperture with the second fuse end residing at the surrounding outer edge of the substrate, the surrounding outer edge being spaced from the aperture.

18. An electrical power providing device, comprising:
   a) a battery having a terminal pin extending from a header;
   b) a housing attached to the battery;
   c) a terminal cap attached to the housing;
   c) a substrate attached to the battery, wherein the substrate resides between the terminal cap and the header for the battery; and
   e) a trace fuse supported by the substrate, the fuse having a fusible portion intermediate first and second ends, wherein the first end is directly electrically connected to the terminal pin and the second end is directly electrically connected to an electrical device powered by the battery.

19. The electrical power providing device of claim 18 wherein the substrate resides between the terminal cap and a bottom wall of the housing, and wherein the bottom wall of the housing is positioned proximate the header of the battery.

20. The electrical power providing device of claim 19 wherein the bottom wall of the housing has an orifice, and the terminal pin resides in the orifice.

* * * * *